(12) United States Patent
Aravamudan (10) Patent No.: US 9,421,717 B2
(45) Date of Patent: Aug. 23, 2016

(54) MANUFACTURING A COMPOSITE (76) Inventor: Gosakan Aravamudan, Bangalore (IN)

(*) Notice: Subject to any disclaimer, the term of this patent is extended or adjusted under 35 U.S.C. 154(b) by 546 days.

(21) Appl. No.: 13/878,228

(22) PCT Filed: Sep. 23, 2011

(86) PCT No.: PCT/IN2011/000662
§ 371 (c)(1),
(2), (4) Date: Apr. 8, 2013

(87) PCT Pub. No.: WO2012/046246
PCT Pub. Date: Sep. 23, 2011

(65) Prior Publication Data
US 2013/0187314 A1 Jul. 25, 2013

(30) Foreign Application Priority Data
Oct. 8, 2010 (IN) .............................. 2979/CHE/2010

(51) Int. Cl.
B29C 70/44 (2006.01)
B29C 43/10 (2006.01)
B29C 39/42 (2006.01)

(52) U.S. Cl.
CPC ............... B29C 70/443 (2013.01); B29C 39/42 (2013.01); B29C 43/10 (2013.01)

(58) Field of Classification Search
CPC ................ B29C 43/12; B29C 43/3642; B29C 2043/3649; B29C 70/36; B29C 70/443
See application file for complete search history.

(56) References Cited

U.S. PATENT DOCUMENTS

| | | | | |
|---|---|---|---|---|
| 1,568,778 A * | 1/1926 | Sohl | ....................... | B29C 73/325 425/27 |
| 2,937,401 A * | 5/1960 | Amos | .................... | B29C 33/505 264/102 |
| 2,975,476 A * | 3/1961 | Burke | ...................... | B29C 33/04 100/211 |
| 3,566,650 A * | 3/1971 | Johnson | .................. | B21D 22/12 264/553 |
| 3,614,811 A * | 10/1971 | Johnson | .................... | B30B 5/02 264/314 |
| 4,148,597 A * | 4/1979 | Larsen | .................... | B29C 43/32 100/211 |
| 5,087,193 A * | 2/1992 | Herbert, Jr. | .................... | 425/543 |
| 5,152,949 A * | 10/1992 | Leoni | .................. | B29C 43/3642 264/257 |
| 5,316,462 A * | 5/1994 | Seemann | ................. | B29C 33/10 264/316 |
| 5,545,026 A * | 8/1996 | Fritz | .................... | B29C 43/3607 264/314 |
| 5,565,162 A * | 10/1996 | Foster | ................. | B29C 37/0064 264/257 |
| 6,406,659 B1 * | 6/2002 | Lang et al. | ..................... | 264/510 |
| 6,991,449 B1 * | 1/2006 | Mead | ....................... | B29C 43/12 156/286 |

* cited by examiner

Primary Examiner — Matthew Daniels
(74) Attorney, Agent, or Firm — Ash Tankha; Lipton, Weinberger & Husick (57) ABSTRACT An apparatus and method for manufacturing a composite is provided. A bottom release layer is disposed within a cavity of a volumetrically restraining body structure for supporting a cast material. An air bag is disposed between the bottom release layer and one or more surfaces of the volumetrically restraining body structure within the cavity. An air compressor connected to the air bag pressurizes the air bag. The pressurized air bag compresses the cast material against the bottom release layer. The resin inlets disposed on the cast material infuse resin into the cast material. A vacuum outlet insertably connected in the cavity of the volumetrically restraining body structure, in communication with the cast material, draws a vacuum through the cast material and draws the resin into the cast material. The compression of the cast material reduces excessive resin rich areas in the composite created from the resin infused cast material.

12 Claims, 11 Drawing Sheets

MANUFACTURING A COMPOSITE

CROSS-REFERENCE TO RELATED APPLICATIONS

This application claims the benefit of the following patent applications:
1. Provisional patent application number 2979/CHE/2010 titled "Manufacturing a Composite", filed on 8 Oct. 2010 in the Indian Patent Office.
2. PCT application number PCT/IN2011/000662 titled "Manufacturing A Composite", filed on 23 Sep. 2011 in the Indian Patent Office.

The specifications of the above referenced applications are incorporated herein by reference in their entirety.

BACKGROUND

The apparatus and method disclosed herein, in general, relates to manufacturing composites.

In the current art of vacuum assisted resin transfer molding, a breather layer is used for removing excess resin and for providing a medium for removal of entrapped air in a composite. The breather layer is usually a sacrificial layer that increases the cost of manufacturing. There is a need to eliminate the use of such breather layers in the vacuum assisted resin transfer molding process. A semi-permeable membrane that is permeable to air, but impermeable to resins may replace the use of breather layers in the vacuum assisted resin transfer molding process. However, such semi-permeable membranes have a limited life, are expensive, and require proper handing. The placement and removal of a semi-permeable membrane below a vacuum bag used in the vacuum assisted resin transfer molding process is an additional manufacturing process that needs to be avoided. If a resin were to be injected in a channel in the vacuum assisted resin transfer molding process, the resin will travel a limited distance from the channel and the casting of large areas is not possible using a single channel. If multiple channels are used, there is a significant risk of air entrapment between resin fronts radiating from different channels. Hence, there is an unmet need for a vacuum assisted resin transfer molding process for the manufacture of large areas of composites, which minimizes the entrapment of air and the creation of pores and cavities within the composites, with a reduction in the use of breather layers and semi permeable membranes.

Resin composites are commonly manufactured using resin transfer molding by injecting a cast material, for example, a fiber composite, with resin under a vacuum. In most end applications, it is critical that the resin is evenly infused in the entire section of the cast material. If excess resin is injected in certain sections of the cast material, the excess resin may result in part rejects or an increase in costs. In resin transfer molding systems, there is an unmet need to efficiently reduce resin rich or resin excess areas.

Typically, in the vacuum assisted resin transfer molding process, resin is injected at a negative pressure, which avoids lifting a top sheet of the vacuum bag during resin injection with excess resin due to a hydraulic head created by an input resin reservoir. Injecting resin at positive pressure has its advantages, for example, in increasing a resin infusion rate. In such positive pressure resin injection systems, there is an unmet need to reduce resin rich or resin excess areas created by the undesirable lifting of the top release sheet of the mold.

The mold cycle time must be minimized in order to produce articles economically. Some of the activities that negatively affect the mold cycle time comprises using tacky tapes for sealing, utilizing "use and throw" resin channels, cleaning resin flash, and lifting, placement, positioning, and using tapes for sealing of the vacuum bag. There is an unmet need to reduce or obviate the need for the above steps.

The injected resin in a high temperature based vacuum assisted process may rapidly gel. It is necessary that the resin travels the entire section of the mold cavity and fully encompasses the cast material before the resin gels. Therefore, there is a need for a method and an apparatus that permit rapid flow of the resin throughout the mold.

In the current art, vacuum bags are used in vacuum assisted resin transfer molding processes. In U.S. Pat. No. 7,189,345, the term "inflatable bladder" has been synonymously used with the term "vacuum bag". The "inflatable bladder" as defined in line 3, column 3 of U.S. Pat. No. 7,189,345 is "commonly referred to as vacuum bag". In FIG. 1 and FIG. 2 of U.S. Pat. No. 7,189,345, this "inflatable bladder" is nothing but a regular vacuum bag, similar in construction to the inflatable bladder shown in FIG. 4. In FIG. 4 of U.S. Pat. No. 7,189,345, the outer edges of the inflatable bladder defined by the numeral 108 create a vacuum seal. In FIG. 4, it can be seen that the edges of the inflatable bladder seals with the tool surface. In FIG. 4, the inflatable bladder is illustrated as a sheet with defined and cut edges, indicating that the inflatable bladder is a sheet with edges. It implies that within itself, the inflatable bladder is not a closed system. However, when the inflatable bladder seals with the hard surface of the mold, a closed system develops between the sheet and the hard surface. In column 1, lines 55 to 56, U.S. Pat. No. 7,189,345 states that the "bladder has a resin inlet with fluid communication with the cavity". In column 5, lines 8 to 10, U.S. Pat. No. 7,189,345 states that "vacuum applied to the mold cavity forces the bladder against the composite structure . . . ". There is no reference whatsoever in the entirety of U.S. Pat. No. 7,189,345 to use positive pneumatic pressure or compressed air to press the bladder against the mold cavity. Furthermore, there is no reference whatsoever in the entirety of U.S. Pat. No. 7,189,345 to compressed air being enclosed in a closed system for the application of pressure.

Therefore, there is a long felt but unresolved need for an apparatus and method that enables manufacture of large areas of composites, which minimizes the entrapment of air and the creation of pores and cavities within the composites, efficiently reduces resin rich or resin excess areas in the composite, and permits rapid flow of resin throughout the composite.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The apparatus and method disclosed herein addresses the above stated need for manufacturing large areas of composites, which minimizes the entrapment of air and the creation of pores and cavities within the composites. The apparatus and method disclosed herein efficiently reduces resin rich or resin excess areas in the composites and permits rapid flow of resin throughout the composite.

The apparatus for manufacturing a composite disclosed herein comprises a volumetrically restraining body structure, a bottom release layer, an air bag, an air compressor, one or more resin inlets, and a vacuum outlet. The volumetrically restraining body structure defines a cavity for accommodating the air bag. The bottom release layer that defines a mold surface is disposed within the cavity of the volumetrically restraining body structure. The bottom release layer supports a cast material deposited on the bottom release layer. The cast material deposited on the bottom release layer to manufacture the composite, for example, comprises a layer of particulates over a layer of glass fiber. The air bag is disposed between the bottom release layer and one or more surfaces of the volumetrically restraining body structure within the cavity. In an embodiment, one or more surfaces of the air bag are composed, for example, of a flexible metal sheet surfaced with a silicone coating, for example, a silicone coated aluminum sheet.

The air compressor is connected to the air bag for pressurizing the air bag. The pressurized air bag compresses the deposited cast material against the bottom release layer. The resin inlets are disposed on the deposited cast material for infusing resin into the deposited cast material. The vacuum outlet is insertably connected in the cavity of the volumetrically restraining body structure, in communication with the deposited cast material, for drawing a vacuum through the deposited cast material and for drawing the resin from the resin inlets into the deposited cast material. The compression of the deposited cast material by the pressurized air bag reduces excessive resin rich areas in the composite created from the deposited cast material infused with the resin. The composite created from the deposited cast material infused with the resin is herein referred to as a "resin infused cast material". In an embodiment, the apparatus disclosed herein further comprises a vacuum pump connected to the air bag for deflating the air bag and enabling easy retrieval of the resin infused cast material.

In the air bag of the apparatus disclosed herein, there are no edges, thereby defining the air bag as an internal closed system. The "inflatable bladder" of U.S. Pat. No. 7,189,345 cannot be construed or interpreted as an air bag. In column 3, lines 59 to 61 of U.S. Pat. No. 7,189,345, in an exemplary embodiment, the bladder edges are taped to a tool surface. If the inflatable bladder of U.S. Pat. No. 7,189,345 were actually an air bag, the inflatable bladder cannot be taped to the tool surface as the infusion of air into the air bag will expand the air bag and disengage the air bag from the tool surface.

In an embodiment, a surface of the air bag proximal to the bottom release layer serves as a top release layer. The air bag of the apparatus disclosed herein provides the following functional advantages. Firstly, the pressure of the air bag creates an airtight seal in areas of contact between the top release layer and the bottom release layer. Hence, there is no need for using tacky tapes or for applying any other laborious means for creating an airtight seal. Secondly, the pressure of the air bag pushes the impervious top release layer against the cast material deposited on the bottom release layer, and does not allow resin from overfilling the deposited cast material, which would otherwise unnecessarily increase the thickness of the final resin infused cast material. Thirdly, if a heating means is placed within the air bag, heat can be rapidly applied to the resin infused cast material, where the heat radiates through the thin surface of the air bag. If heat were to be applied from the rear of the volumetrically restraining body structure, thermal energy will be wasted on the volumetrically restraining body structure and the bottom release layer underneath the deposited cast material.

In an embodiment, the apparatus disclosed herein further comprises one or more resin channels integrated into one or more surfaces of the air bag proximal to the deposited cast material for infusing the resin into the deposited cast material. For example, resin channels are integrated in the bottom surface of the air bag which is in contact with the deposited cast material. In another embodiment, the resin channels are not directly integrated into one or more surfaces of the air bag. In this embodiment, one or more discrete resin channels are disposed on the deposited cast material for infusing the resin into the deposited cast material. Either a surface of the air bag serves as the top release layer, or optionally an impervious release sheet can be placed on the deposited cast material.

In an embodiment, the apparatus disclosed herein further comprises a heat reflective coating applied to an inner top surface of the air bag for avoiding heat loss and for focusing heat onto the deposited cast material. In another embodiment, the apparatus disclosed herein further comprises a thermal insulation applied to a top surface of the air bag for avoiding heat loss through a top surface of the air bag. The thermal insulation may be provided on the outer top surface of the air bag or on the inner top surface of the air bag above the heat reflective coating.

In another embodiment, the apparatus disclosed herein further comprises a vacuum sealing strip integrated into one or more surfaces of the air bag proximal to the deposited cast material for establishing a vacuum seal between the surfaces of the air bag and the bottom release layer. In another embodiment, the apparatus disclosed herein further comprises a vacuum sealing strip integrated into one or more surfaces of the bottom release layer for establishing a vacuum seal between one or more surfaces of the air bag and the bottom release layer. For example, vacuum sealing strips are located on the bottom surface of the air bag that contacts the deposited cast material, and the bottom release layer. In this case, the pressure of the air bag creates an airtight seal in the areas of the contact between the surface of the air bag that serves as the top release layer, and the bottom release layer on which the cast material is deposited.

In another embodiment, the apparatus disclosed herein further comprises a heating means positioned within the air bag for heating the resin infused cast material to a partial cure or a full cure. The heating means comprises, for example, resistive elements, coil based thermal elements, infrared heating elements, a heated fluid, etc. Rapid heating reduces mold cycle time. If a heating means is placed within the air bag, the heat can be rapidly applied to the resin infused cast material through the thin surface of the air bag. In contrast, if heat is applied from the rear of the volumetrically restraining body structure, thermal energy will be wasted on the volumetrically restraining body structure and the bottom release layer underneath the deposited cast material.

In another embodiment, the volumetrically restraining body structure is inclinable at varying angles. The volumetrically restraining body structure can therefore be inclined, for example, at an angle of about 30°. Inclining the volumetrically restraining body structure flattens the shape of the front of the resin, herein referred to as the "resin front", flowing in the deposited cast material and reduces air pockets in the deposited cast material. The apparatus and method for manufacturing the composite disclosed herein creates a shaped resin front that does not allow for air entrapment in the deposited cast material. As used herein, the term "resin front" refers to the front side of the resin flowing through the deposited cast material. A resin hydraulic head provided by a resin reservoir makes the resin flow in the area of the deposited cast material, neighboring the resin channels, equally progressive and ensures that for a given distance, one resin front does not overtake another resin front, thereby avoiding the creation of air pockets in the deposited cast material. As used herein, the term "resin hydraulic head" refers to gravitational weight of the resin in the resin reservoir. The inclination of the volumetrically restraining body structure ensures that the resin hydraulic head progressively decreases along the length of each of the resin channels. This results in the complete filling or infusion of the resin in the deposited cast material as the resin front travels forward.

The method for manufacturing a composite disclosed herein comprises the following steps. A volumetrically restraining body structure that defines a cavity is provided. A bottom release layer is disposed within the cavity of the volumetrically restraining body structure. A material to be casted herein referred to as a "cast material" is deposited on the bottom release layer. A border is allowed for on the bottom release layer around the deposited cast material where there is no cast material deposited. An air bag is disposed between the deposited cast material and one or more surfaces of the volumetrically restraining body structure within the cavity. The air bag is pressurized using an air compressor connected to the air bag. The pressurized air bag expands and compresses the deposited cast material against the bottom release layer. Pressurizing the air bag automatically creates an airtight seal along the border of the bottom release layer and the air bag, for enabling creation of a vacuum in the deposited cast material. The airtight seal is defined by compression of vacuum sealing strips, for example, rubberized strips integrated into the bottom surface of the air bag and the bottom release layer. A vacuum is applied to the deposited cast material that is sandwiched between the bottom release layer and the air bag. A resin mix is infused into the deposited cast material, for example, via the resin channels of the air bag, while the vacuum is applied to the deposited cast material. The resin infused cast material creates the composite when the infused resin in the deposited cast material fully cures or partially cures. The compression of the deposited cast material by the pressurized air bag reduces excessive resin rich areas in the created composite. The expanded air bag is deflated using a vacuum pump connected to the air bag after the infused resin in the deposited cast material fully cures or partially cures.

The apparatus and method for manufacturing the composite disclosed herein may be used to manufacture any type of composite that requires resin infusion. Moreover, the apparatus and method for manufacturing the composite disclosed herein creates a shaped resin front that does not allow for air entrapment in the resin infused cast material. The incline of the volumetrically restraining body structure makes the resin flow in the area of the deposited cast material neighboring the resin channels, equally progressive and one resin front does not overtake another resin front to create air pockets in the deposited cast material. The inclination of the volumetrically restraining body structure ensures that the resin hydraulic head progressively decreases along the length of each of the resin channels. This results in the complete infusion of the resin in the deposited cast material as the resin front uniformly travels forward, thereby uniformly travels forward, thereby minimizing or eliminating air traps in the resin infused cast material.

Furthermore, the apparatus and method for manufacturing the composite disclosed herein provides an air bag that in one embodiment provides three functions simultaneously: application of pressure, generation of an airtight seal between the top release layer and the bottom release layer, and application of heat to cure the infused resin using an inbuilt heating means within the air bag. The simultaneous integration of the above mentioned three functions reduces the mold set up time and the mold cycle time.

The apparatus and method for manufacturing the composite disclosed herein has several advantages over presently known devices or systems. The apparatus and method for manufacturing the composite disclosed herein can be used to create resin based composites such as the "Artificial Stone Laminate" disclosed in co-pending application number PCT/IN2011/000602 filed in the Indian Patent office, or other fiber reinforcement components using fiberglass, Kevlar® aromatic polyamide fiber developed by E. I. du Pont de Nemours and Company Corporation, boron, carbon fiber cloth reinforcement, etc., without the necessity for expensive equipment. The apparatus and method for manufacturing the composite disclosed herein does not require a worker to necessarily touch the resin or directly contact the resin. The resin is covered in a container during mixing and de-gassing and under the vacuum blanket during impregnation of fiber reinforcement and curing. The vacuum exhaust is let out in a controlled area, thereby providing a toxicity-free working environment. The reduced mold set up time and the reduced mold cycle time result in cost and efficiency benefits.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

DETAILED DESCRIPTION OF THE INVENTION

Figure 1:
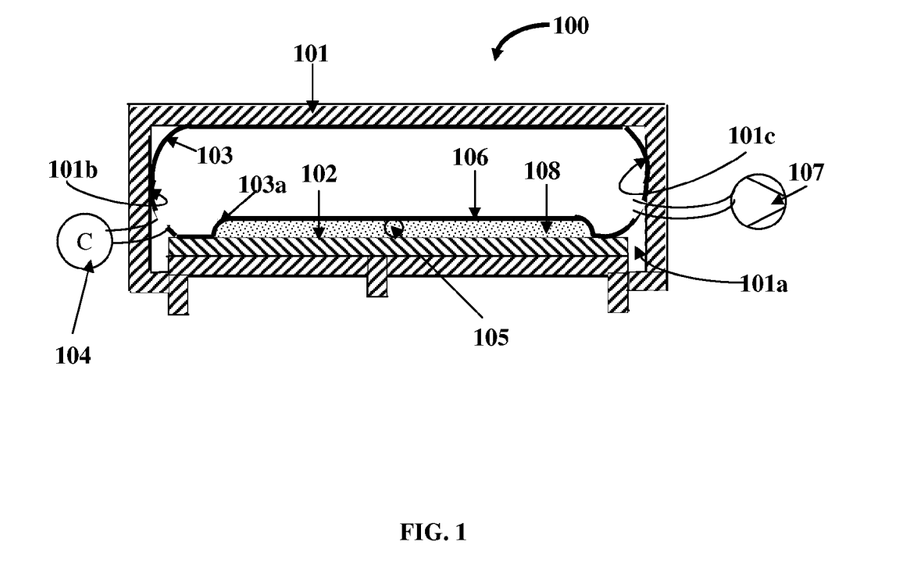
FIG. 1 exemplarily illustrates a sectional view of an apparatus for manufacturing a composite.

FIG. 1 exemplarily illustrates a sectional view of an apparatus 100 for manufacturing a composite. The apparatus 100 disclosed herein, also referred to as a "manufacturing apparatus", comprises a volumetrically restraining body structure 101 that defines a cavity 101a, a bottom release layer 102, an air bag 103, an air compressor 104, and one or more resin inlets 105. The bottom release layer 102 that defines a mold surface is disposed within the cavity 101a of the volumetrically restraining body structure 101. The bottom release layer 102 is, for example, one or more of a polytetrafluoroethylene (PTFE) sheet, a silicone rubber sheet, a metal coated with PTFE or release agents, a polyethylene terephthalate (PET) sheet, or surfaces on which release agents such as wax or silicone are applied. The bottom release layer 102 supports a cast material 108 deposited on the bottom release layer 102. As used herein, the term "cast material" refers to any material that requires infusion of resin 111 exemplarily illustrated in FIG. 2 and FIG. 6 to create the composite. The cast material 108 is, for example, the material deposited in the mold prior to infusion of the resin 111 to create the "Artificial Stone Laminate" disclosed in co-pending application number PCT/IN2011/000602 filed in the Indian Patent office. The cast material 108 comprises, for example, fibers, woven cloth, braided cloth, knit cloth, mat, stitched layers of material, tow, yarn, tape, etc. A reinforcement of the fibers herein referred to as a "fiber reinforcement" is either a stitched material or a non-stitched material. The fiber reinforcement comprises, for example, one or more materials such as glass fiber, graphite, boron, carbon, aramid such as the material marketed as Kevlar® of E. I. du Pont de Nemours and Company Corporation, etc. Also, as used herein, the term "resin" refers to a binder, for example, an epoxy resin, an acrylic resin, a polyester resin, a polyimide resin, a phenolic resin, etc., used in resin transfer molding processes. The cast material 108 needs to be infused with the resin 111 to create the composite.

Figure 2:
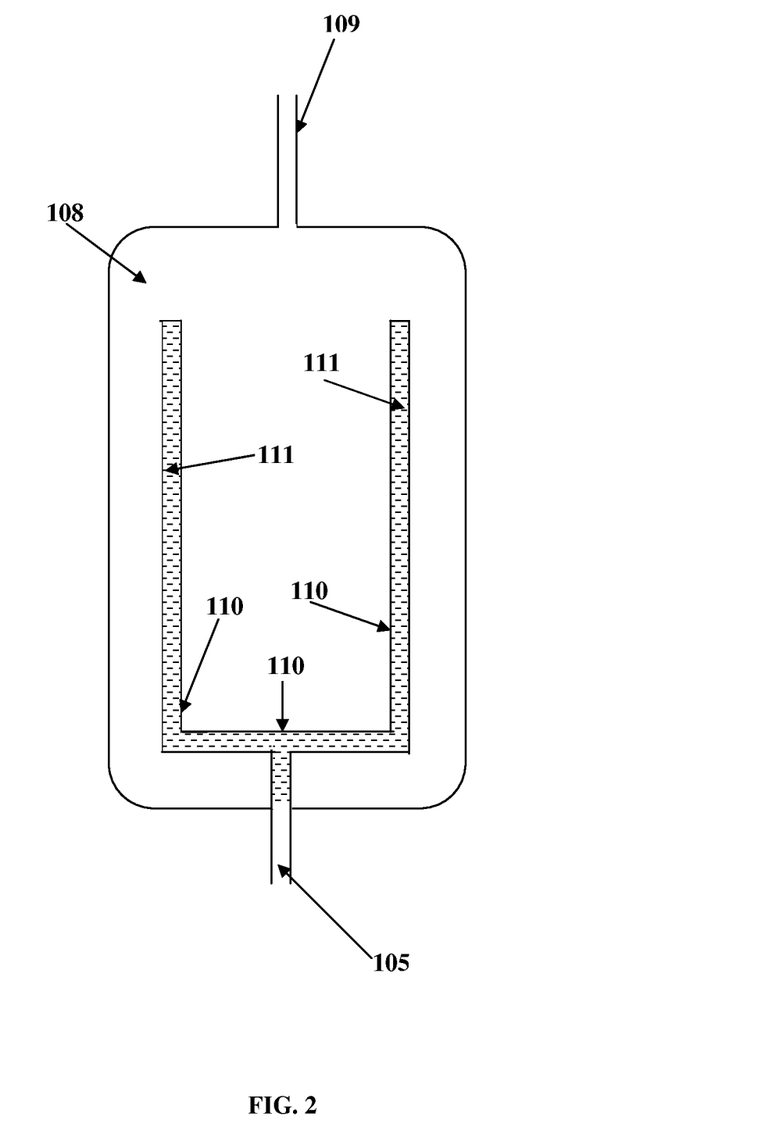
FIG. 2 exemplarily illustrates a top orthographic view of resin channels disposed on a cast material.

The air bag 103 of the apparatus 100 disclosed herein is disposed between the bottom release layer 102 and one or more surfaces 101b and 101c of the volumetrically restraining body structure 101 within the cavity 101a. The air bag 103 is composed of a flexible material, for example, a knitted glass fiber mat coated with silicone rubber, with an airtight finish. The air compressor 104 is connected to the air bag 103 for pressurizing the air bag 103. The pressurized air bag 103 compresses the deposited cast material 108 against the bottom release layer 102. One or more resin inlets 105 are disposed on the deposited cast material 108 for infusing resin 111 into the deposited cast material 108. A vacuum outlet 109, exemplarily illustrated in FIG. 2, is insertably connected in the cavity 101a of the volumetrically restraining body structure 101, in communication with the deposited cast material 108, for drawing a vacuum through the deposited cast material 108, for example, via a vacuum pump (not shown) and for drawing the resin 111 from the resin inlet 105 into the deposited cast material 108. The compression of the deposited cast material 108 by the pressurized air bag 103 reduces excessive resin rich areas in the composite created from the deposited cast material 108 infused with the resin 111. The composite created from the deposited cast material 108 infused with the resin 111 is herein referred to as a "resin infused cast material". In an embodiment, the apparatus 100 disclosed herein further comprises a vacuum pump 107 connected to the air bag 103 for deflating the air bag 103 and enabling easy retrieval of the resin infused cast material 108.

In an embodiment, one or more surfaces, for example, 103a of the air bag 103 are composed, for example, of a flexible metal sheet surfaced with a silicone coating, for example, a silicone coated aluminum sheet. The pressure of the air bag 103 compresses the deposited cast material 108 and does not allow the infused resin 111 from overfilling the deposited cast material 108. Hence, the air bag 103 results in eliminating resin rich areas that are detrimental to the structural integrity of the composite and the final cost of the composite. The pressure of the air bag 103 compresses the cast material 108, reduces the space for pores, and thereby also reduces the overall porosity of the cast material 108.

FIG. 2 exemplarily illustrates a top orthographic view of resin channels 110 disposed on a cast material 108. In an embodiment, the apparatus 100 disclosed herein, exemplarily illustrated in FIG. 1, further comprises one or more resin channels 110 disposed on the deposited cast material 108 for infusing the resin 111 into the deposited cast material 108. The resin channels 110 are not directly integrated into a surface 103a of the air bag 103 as exemplarily illustrated in FIGS. 7-8. In this embodiment, discrete resin channels 110 are disposed on the deposited cast material 108. Either the air bag 103 serves as the top release layer 106, or optionally an impervious release sheet (not shown) can be placed on the deposited cast material 108. The resin channels 110 are connected to and are in fluid communication with the resin inlet 105. The vacuum outlet 109 is in communication with the deposited cast material 108 for drawing a vacuum through the deposited cast material 108, for example, via a vacuum pump (not shown) and for drawing the resin 111 from the resin inlet 105 into the deposited cast material 108.

The resin channels 110 in contact with the cast material 108 are of a height of, for example, about 15 millimeters (mm) and have, for example, a circular section or a square section. The resin channels 110 are constructed of, for example, a metal coated with polytetrafluoroethylene (PTFE), silicone or other non stick materials, or PTFE tubing.

Figure 3A:
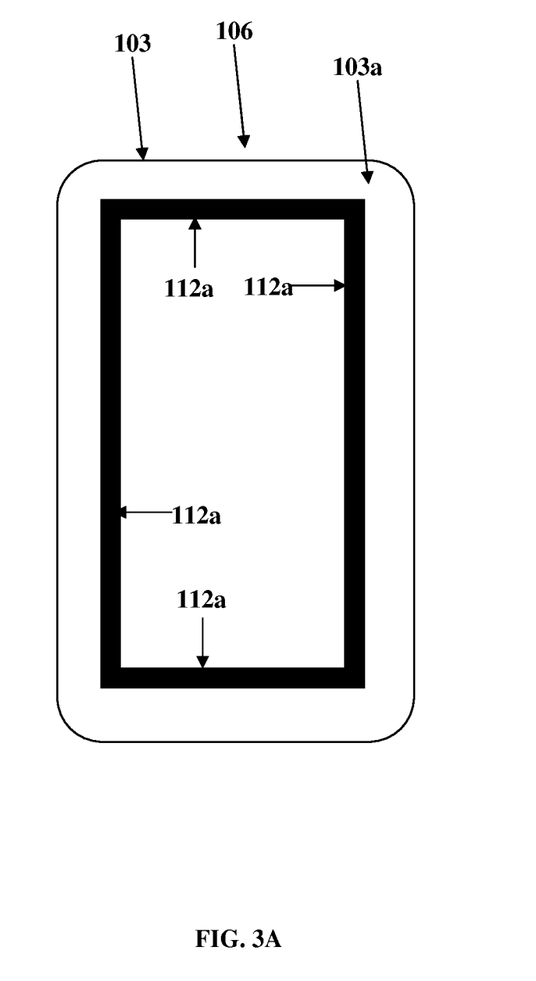
FIG. 3A exemplarily illustrates a bottom orthographic view of an air bag, showing a vacuum sealing strip integrated in the bottom surface of the air bag.

FIG. 3A exemplarily illustrates a bottom orthographic view of an air bag 103, showing a vacuum sealing strip 112a integrated in the bottom surface 103a of the air bag 103. In an embodiment, the apparatus 100 exemplarily illustrated in FIG. 1 further comprises a vacuum sealing strip 112a integrated into one or more surfaces, for example, the bottom surface 103a of the air bag 103 proximal to the deposited cast material 108 for establishing a vacuum seal between the bottom surface 103a of the air bag 103 and the bottom release layer 102. The vacuum sealing strip 112a is, for example, a strip of soft silicone rubber. In this embodiment, the bottom surface 103a of the air bag 103 proximal to the bottom release layer 102 serves as a top release layer 106. In this embodiment, the pressure of the air bag 103 and the vacuum sealing strip 112a creates an airtight seal in the area of contact between the top release layer 106 and the bottom release layer 102 exemplarily illustrated in FIG. 1. Hence, there is no need to use tacky tapes or any other laborious means for creating an airtight seal.

Figure 3B:
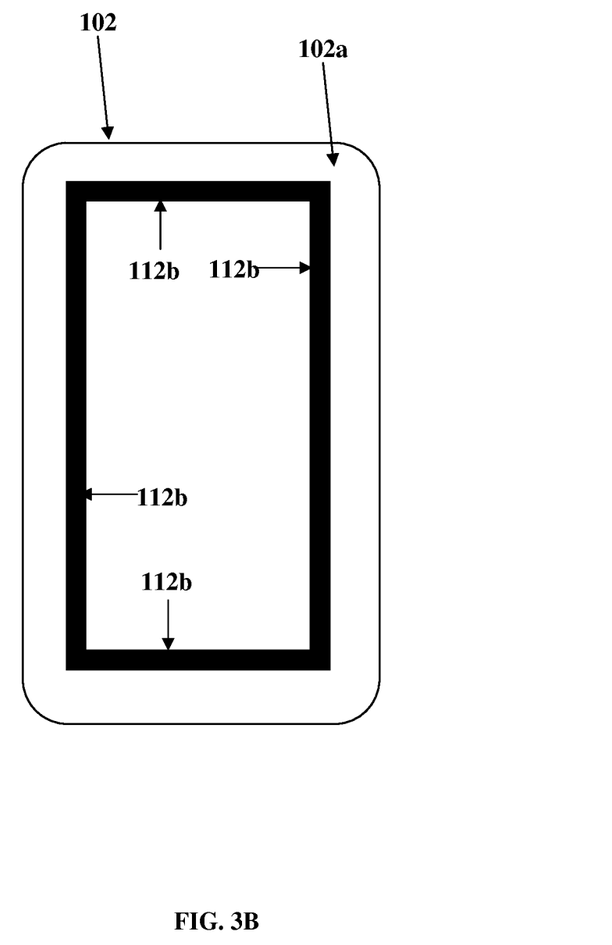
FIG. 3B exemplarily illustrates a top orthographic view of a bottom release layer, showing a vacuum sealing strip integrated in the top surface of the bottom release layer.

FIG. 3B exemplarily illustrates a top orthographic view of a bottom release layer 102, showing a vacuum sealing strip 112b integrated in the top surface 102a of the bottom release layer 102. In an embodiment, the apparatus 100, exemplarily illustrated in FIG. 1, further comprises a vacuum sealing strip 112b integrated, for example, into the top surface 102a of the bottom release layer 102 for establishing a vacuum seal between the bottom surface 103a of the air bag 103 and the bottom release layer 102. The vacuum sealing strip 112b is, for example, a strip of soft silicone rubber. The vacuum sealing strip 112b of the bottom release layer 102 is collocated below the vacuum sealing strip 112a integrated in the bottom surface 103a of the air bag 103 that serves as the top release layer 106 exemplarily illustrated in FIG. 3A. The pressurized contact between the vacuum sealing strip 112b of the bottom release layer 102 and the vacuum sealing strip 112a of the top release layer 106 provides an improved airtight connection between the top release layer 106 and the bottom release layer 102. Hence, there is no need to use tacky tapes or any other laborious means for creating an airtight seal.

Figure 4:
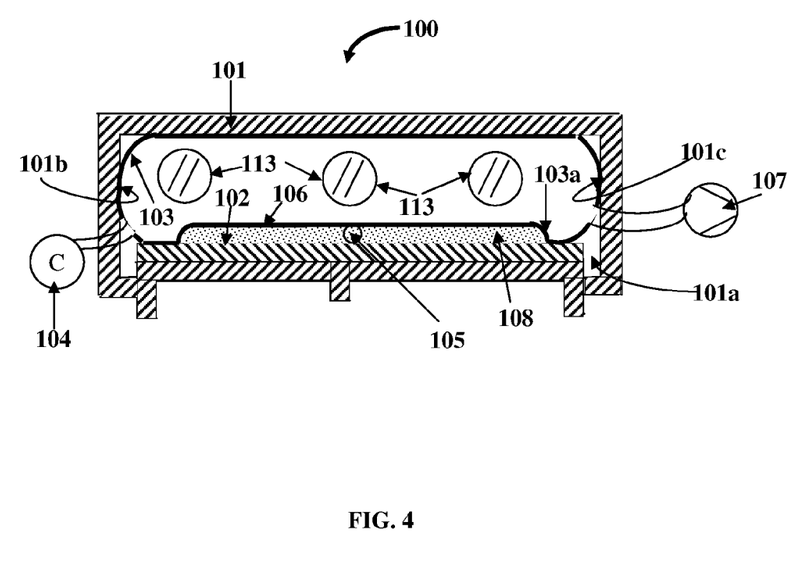
FIG. 4 exemplarily illustrates a sectional view of the manufacturing apparatus, showing heating elements positioned within the air bag of the manufacturing apparatus.

FIG. 4 exemplarily illustrates a sectional view of the manufacturing apparatus 100, showing heating elements 113 positioned within the air bag 103 of the manufacturing apparatus 100. In an embodiment, the apparatus 100 disclosed herein further comprises a heating means positioned within the air bag 103 for heating the deposited cast material 108 infused with the resin 111 to a partial cure or a full cure. The heating means emits heat and causes the resin infused cast material 108 to achieve a high temperature of, for example, about 90 degrees Celsius. In an embodiment, the heating means comprises, for example, resistive elements. In another embodiment, the heating means comprises, for example, infrared heating elements 113. In another embodiment, the heating means comprises, for example, a heating liquid such as heated steam, heated water, heated oil, etc. Examples of the heating means comprise a resistance based nichrome wire, ribbon or strip wires, heat lamps, infrared heat sources, etc. The heating elements 113 typically use, for example, a nichrome wire, ribbon or strip as the heating means. Other common forms of heating elements 113 are, for example, etched foil, a tubular sealed element, heat lamps, etc.

If the heating means is placed within the air bag 103, the heat can be rapidly applied to the resin infused cast material 108. The heat rapidly radiates to the resin infused cast material 108 through the thin surface of the air bag 103. In contrast, if the heat were to be applied from the rear of the volumetrically restraining body structure 101, thermal energy will be wasted on the volumetrically restraining body structure 101 and the bottom release layer 102. Rapid thermal heating reduces the mold cycle time and reduces the viscosity of the input resin 111.

Figure 5:
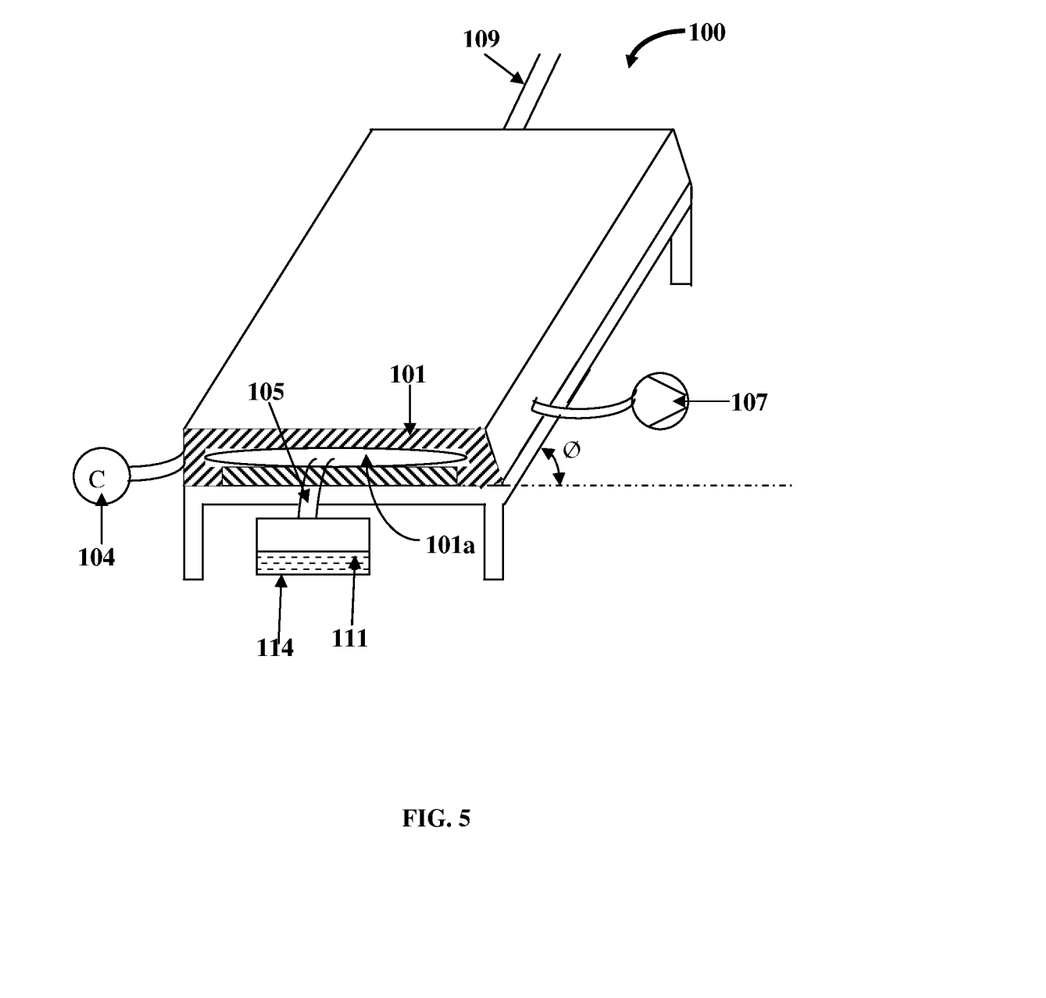
FIG. 5 exemplarily illustrates a perspective view of an inclined volumetrically restraining body structure of the manufacturing apparatus.

FIG. 5 exemplarily illustrates a perspective view of an inclined volumetrically restraining body structure 101 of the manufacturing apparatus 100. The base of the volumetrically restraining body structure 101 is, for example, a metal structure with a planar surface. The volumetrically restraining body structure 101 may be of any shape and need not necessarily be planar. The advantage of pressurizing the air bag 103 accommodated in the cavity 101a of the volumetrically restraining body structure 101 as exemplarily illustrated in FIG. 1, is that the air bag 103 conforms to different shape molds. The volumetrically restraining body structure 101 must have sufficient strength to support the pressure build up in the pressurized air bag 103. In an embodiment, the volumetrically restraining body structure 101 is inclinable at varying angles for flattening a shape of the front 115 of the resin 111, herein referred to as the "resin front", flowing in the cast material 108 deposited on the bottom release layer 102 of the apparatus 100. As used herein, the term "resin front" refers to the front side 115 of the resin 111 flowing through the deposited cast material 108. The volumetrically restraining body structure 101 is inclined, for example, at an angle of 30°. This will flatten out the resin front 115 as exemplarily illustrated in FIG. 6 and reduce air pockets in the deposited cast material 108. The shape of the resin front 115 flowing in the deposited cast material 108 during the infusion of the resin 111 is exemplarily illustrated in FIG. 6.

The apparatus 100 and method for manufacturing the composite disclosed herein creates a shaped resin front 115 that does not allow for air entrapment in the deposited cast material 108. A resin hydraulic head provided by a resin reservoir 114 makes the flow of the resin 111 in the area of the deposited cast material 108, neighboring the resin channels 110, equally progressive and ensures that for a given distance, one resin front 115 does not overtake another resin front 115, thereby avoiding the creation of air pockets in the deposited cast material 108. As used herein, the term "resin hydraulic head" refers to gravitational weight of the resin 111 in the resin reservoir 114. The resin reservoir 114 from which the resin 111 is injected into the resin channels 110 via the resin inlet 105 exemplarily illustrated in FIG. 2 and FIGS. 6-8 may be moved vertically to adjust the resin hydraulic head. The inclination of the volumetrically restraining body structure 101 ensures that the resin hydraulic head progressively decreases along the lengths of the resin channels 110. This results in the complete infusion of the resin 111 in the deposited cast material 108 as the resin front 115 uniformly travels forward, thereby minimizing or eliminating air traps in the resin infused cast material 108.

Figure 6:
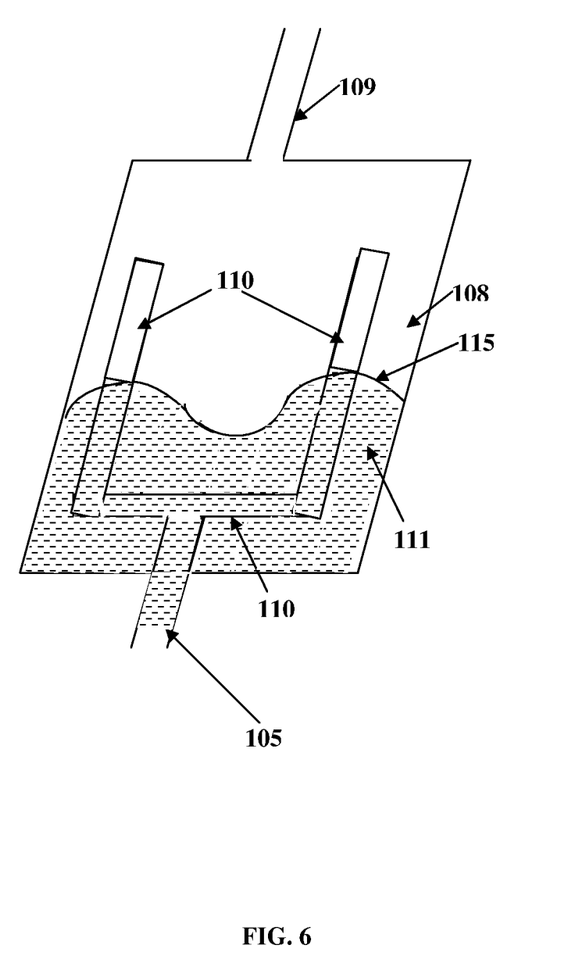
FIG. 6 exemplarily illustrates a shape of the front of resin flowing in the deposited cast material.

FIG. 6 exemplarily illustrates a shape of the front 115 of resin 111 flowing in the deposited cast material 108. The inclination of the volumetrically restraining body structure 101 exemplarily illustrated in FIG. 5, for example, at an angle of 30°, flattens the shape of the resin front 115 flowing in the deposited cast material 108.

Figure 7:
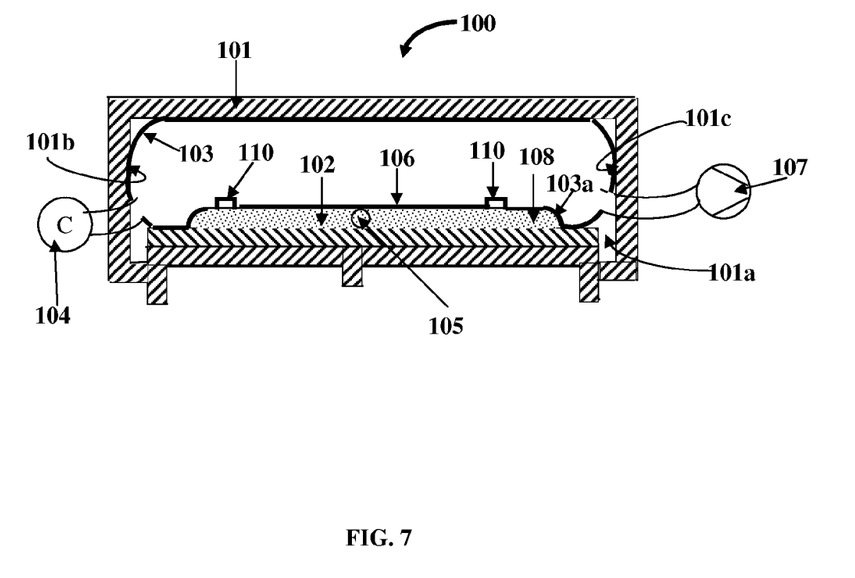
FIG. 7 exemplarily illustrates a sectional view of the manufacturing apparatus, showing resin channels integrated into the bottom surface of the air bag.

FIG. 7 exemplarily illustrates a sectional view of the manufacturing apparatus 100, showing resin channels 110 integrated into the bottom surface 103a of the air bag 103. In an embodiment of the apparatus 100, one or more resin channels 110 are integrated into one or more surfaces, for example, the bottom surface 103a, of the air bag 103 proximal to the deposited cast material 108 for infusing the resin 111 into the deposited cast material 108. The resin channels 110 are integrated into the bottom surface 103a of the air bag 103 that contacts the deposited cast material 108. The resin channels 110 are connected to and are in fluid communication with the resin inlet 105. The vacuum outlet 109, exemplarily illustrated in FIG. 2, that is in communication with the deposited cast material 108 draws a vacuum through the deposited cast material 108, for example, via a vacuum pump (not shown) and draws the resin 111 from the resin inlet 105 into the deposited cast material 108.

Figure 8:
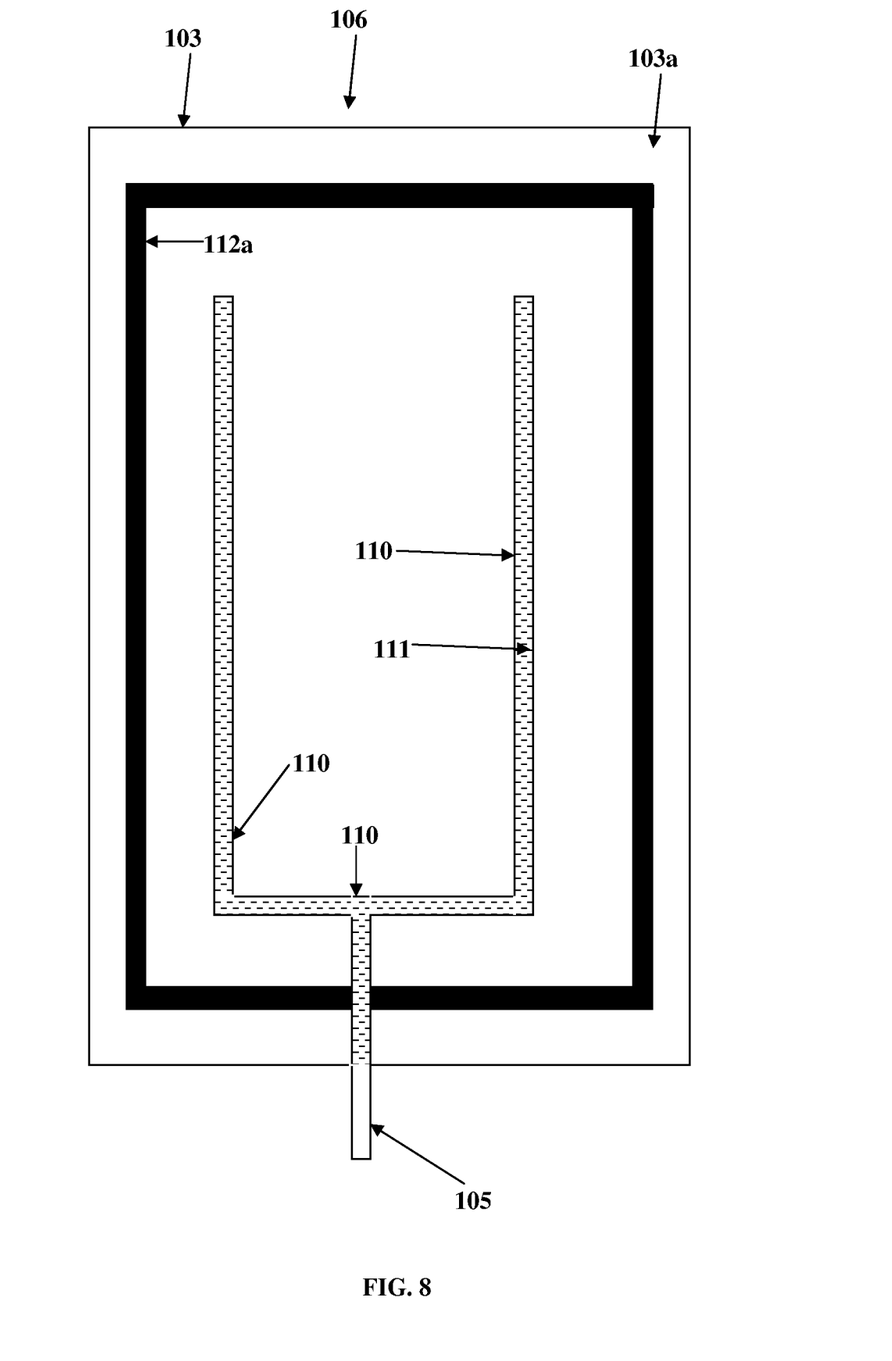
FIG. 8 exemplarily illustrates a bottom orthographic view of the air bag, showing resin channels and a vacuum sealing strip integrated into the bottom surface of the air bag.

FIG. 8 exemplarily illustrates a bottom orthographic view of the air bag 103, showing resin channels 110 and a vacuum sealing strip 112a integrated into the bottom surface 103a of the air bag 103. The vacuum sealing strip 112a is integrated into the bottom surface 103a of the air bag 103 proximal to the deposited cast material 108 for establishing a vacuum seal between the bottom surface 103a of the air bag 103 and the bottom release layer 102 within the cavity 101a of the volumetrically restraining body structure 101 as disclosed in the detailed description of FIG. 3A. The bottom surface 103a of the air bag 103 in proximity with the deposited cast material 108 on the bottom release layer 102 serves as a top release layer 106. The top release layer 106 is, for example, a metal sheet with inbuilt resin channels 110. Another example of the top release layer 106 is a thin coat of silicone rubber on a flexible aluminum sheet. The resin channels 110 in the top release layer 106 are connected to and are in fluid communication with the resin inlet 105. The resin 111 is injected into the resin channels 110 via the resin inlet 105 and infused into the deposited cast material 108.

Figure 9:
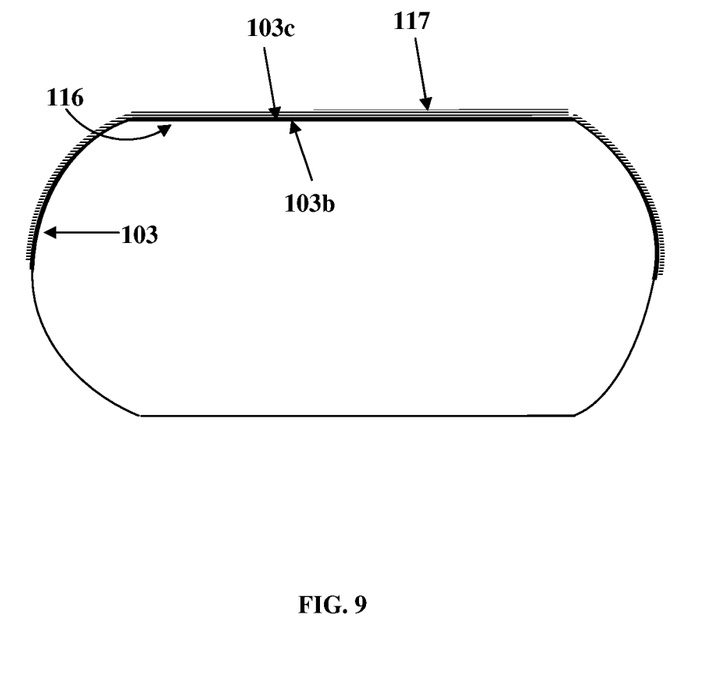
FIG. 9 exemplarily illustrates a front orthographic view of the air bag, showing a heat reflective coating and a thermal insulation applied to top surfaces of the air bag.

FIG. 9 exemplarily illustrates a front orthographic view of the air bag 103, showing a heat reflective coating 116 and a thermal insulation 117 applied to top surfaces 103b and 103c of the air bag 103. In an embodiment, the apparatus 100 disclosed herein, exemplarily illustrated in FIG. 1, further comprises a heat reflective coating 116 applied to an inner top surface 103b of the air bag 103 for avoiding heat loss and for focusing heat onto the deposited cast material 108. In another embodiment, the apparatus 100 disclosed herein further comprises a thermal insulation 117 applied to a top surface 103c of the air bag 103 for avoiding heat loss through a top surface 103c of the air bag 103. The thermal insulation 117 may be provided on the outer top surface 103c of the air bag 103 or on the inner top surface 103b of the air bag 103 above the heat reflective coating 116. The air bag 103 may also have thermal insulation 117 applied to its internal surfaces, for example, 103b that are not in proximity to the deposited cast material 108.

In an embodiment, if a thermally activated catalyst is used to cure the infused resin 111, a thermal heater is positioned within the air bag 103. The thermal heater comprises, for example, heating elements 113 exemplarily illustrated in FIG. 4, and one or more small fans to evenly distribute the heat within the air bag 103. In another embodiment, if a thermally activated catalyst is used to cure the infused resin 111, a thermal heater (not shown) may be positioned on the volumetrically restraining body structure 101 or positioned at the rear of the deposited cast material 108. The thermal heater comprises, for example, coil based heating elements 113.

Figure 10:
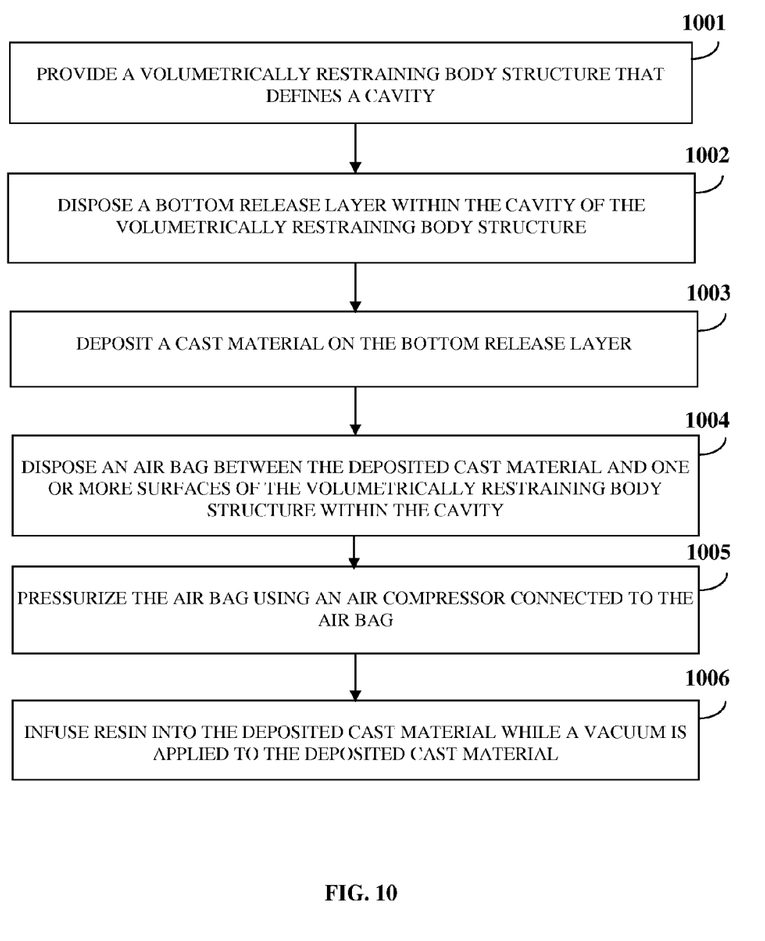
FIG. 10 illustrates a method for manufacturing a composite.

FIG. 10 illustrates a method for manufacturing a composite. The method for manufacturing a composite comprises the following steps: A volumetrically restraining body structure 101 that defines a cavity 101a as exemplarily illustrated in FIG. 1, FIGS. 4-5, and FIG. 7 is provided 1001. A bottom release layer 102 is disposed 1002 within the cavity 101a of the volumetrically restraining body structure 101. A cast material 108 is deposited 1003 on the bottom release layer 102. A border is allowed for on the bottom release layer 102 around the deposited cast material 108 where there is no cast material 108 deposited. An air bag 103 is disposed 1004 between the deposited cast material 108 and one or more surfaces 101b and 101c of the volumetrically restraining body structure 101 within the cavity 101a. The air bag 103 is pressurized 1005 using an air compressor 104 connected to the air bag 103. The pressurized air bag 103 expands and compresses the deposited cast material 108 against the bottom release layer 102. Pressurizing the air bag 103 automatically creates an airtight seal along the border of the bottom release layer 102 and the air bag 103. A resin 111 is infused 1006 into the deposited cast material 108 while a vacuum is applied to the deposited cast material 108 sandwiched between the bottom release layer 102 and the air bag 103. The deposited cast material 108 infused with the resin 111 creates the composite when the infused resin 111 in the deposited cast material 108 fully cures or partially cures. The compression of the deposited cast material 108 by the pressurized air bag 103 reduces excessive resin rich areas in the composite created from the deposited cast material 108 infused with the resin 111. The expanded air bag 103 is deflated using a vacuum pump 107 connected to the air bag 103 after the infused resin 111 in the deposited cast material 108 fully cures or partially cures.

In an embodiment, the resin 111 is injected or introduced into resin channels 110 that are integrated, for example, in the bottom surface 103a of the air bag 103 in contact with the cast deposited material as exemplarily illustrated in FIGS. 7-8. For example, the resin channels 110 are U shaped resin channels 110 with a height of about 15 mm as exemplarily illustrated in FIG. 8. In another embodiment, the resin 111 is injected or introduced into discrete resin channels 110 directly disposed on the deposited cast material 108 for infusing the resin 111 into the deposited cast material 108 as exemplarily illustrated in FIG. 2. In this embodiment, the resin channels 110 are not directly integrated into the bottom surface 103a of the air bag 103.

In another embodiment, a vacuum seal is created in the deposited cast material 108 by one or more vacuum sealing strips 112a and 112b integrated into the bottom surface 103a of the air bag 103 and the bottom release layer 102 respectively. The vacuum seal is defined by compression of the vacuum sealing strips 112a and 112b, for example, rubberized strips integrated into the air bag 103 and the bottom release layer 102 respectively as exemplarily illustrated in FIGS. 3A-3B. The air bag 103 is filled with compressed air to rapidly engage the vacuum in the cast material 108 and deflated to release the compressed air and rapidly remove the resin infused cast material 108 from the cavity 101a of the volumetrically restraining body structure 101. The air bag 103 can be deflated by using a vacuum pump 107 connected to the air bag 103 as exemplarily illustrated in FIG. 1, FIGS. 4-5, and FIG. 7. This allows for a rapid manufacturing process and the reduction of mold cycle time.

In another embodiment, the cast material 108 is heated during casting using a heating means positioned within the air bag 103 as disclosed in the detailed description of FIG. 4. The heated cast material 108 reduces the viscosity of the resin 111 flowing through the deposited cast material 108 and reduces the mold cycle time as a result of higher resin flow speed and faster gelling of the resin 111.

In another embodiment, the volumetrically restraining body structure 101 is inclined to an angle, for example, about 30° as disclosed in the detailed description of FIG. 5. The resin 111 is then injected into the resin channels 110 via the resin inlet 105 as exemplarily illustrated in FIG. 6. In this embodiment, the resin fronts 115 will flatten out and air pockets in the deposited cast material 108 will be minimized if not eliminated in the area of overlapping resin fronts 115 as exemplarily illustrated in FIG. 6.

The following example illustrates the apparatus 100 for manufacturing a composite. A volumetrically restraining body structure 101, for example, a metal reinforced body framework that defines a cavity 101a or a constraining space for accommodating an expanded air bag 103 as exemplarily illustrated in FIG. 1, FIG. 4, and FIG. 7 is provided. A bottom release layer 102, for example, an aluminum sheet with a surface coated with silicone is disposed within the cavity 101a of the volumetrically restraining body structure 101. A cast material 108 requiring resin infusion is deposited on the bottom release layer 102. An airtight silicone air bag 103 constructed by making an impervious coat of silicone on knitted glass fiber is inserted in the cavity 101a of the volumetrically restraining body structure 101. The airtight silicone air bag 103 reinforced with glass fibers is in fluid communication with an inlet connected to a 2 horsepower (HP) air compressor 104 and an outlet connected to a first 0.5 HP vacuum pump 107. The air bag 103 comprises internal nichrome based metal heating elements 113 and four small fans integrated within the air bag 103 to uniformly distribute heat emitted from the nichrome based metal heating elements 113. Silicone rubber vacuum sealing strips 112a exemplarily illustrated in FIG. 3A, are integrated on the bottom surface 103a of the air bag 103 to make contact directly with the bottom release layer 102. A vacuum outlet 109, as exemplarily illustrated in FIG. 2, is provided at one end of the volumetrically restraining body structure 101 to remove air from the deposited cast material 108, that is, air between the bottom release layer 102 and the air bag 103. Resin channels 110 are integrated into the bottom surface 103a of the air bag 103 that is in contact with the deposited cast material 108 as exemplarily illustrated in FIGS. 7-8. The resin inlet 105 for the resin channels 110 is connected to an externally positioned resin reservoir 114 as exemplarily illustrated in FIG. 5. A vacuum pump (not shown) draws air out of the deposited cast material 108 via the vacuum outlet 109. A thermal sensor is introduced between the air bag 103 and the bottom release layer 102 to monitor the temperature of the resin mix 111. Optionally, to smoothen out the resin front 115 exemplarily illustrated in FIG. 6, a pneumatic jack system (not shown) is provided to incline the volumetrically restraining body structure 101 in such a manner that the vacuum outlet 109 is at a higher elevation than the resin inlet 105.

The following example illustrates a method for manufacturing a composite using the apparatus 100 disclosed herein. Once the above manufacturing set up is complete, the cast material 108 is deposited on the bottom release layer 102. The cast material 108 comprises a layer of quartz particles of size about 1.5 mm to about 1.8 mm, overlaid by a layer of glass fibers of about 900 grams per square meter. The air bag 103 is then inflated within its restraining space, that is, the cavity 101a of the volumetrically restraining body structure 101 using the 2 HP air compressor 104. The pressure from the air bag 103 automatically provides an airtight seal between the air bag 103 and the bottom release layer 102 using the flexible silicone rubber vacuum sealing strips 112a integrated on the bottom surface 103a of the air bag 103. The air is evacuated from the deposited cast material 108 using a vacuum pump (not shown) via the vacuum outlet 109. A resin mix 111 is then introduced into the resin reservoir 114. The resin mix 111 comprises, for example, about 60% by weight of isothalic neo pentyl glycol (Iso NPG) with styrene, about 3% by weight of pigments, about 33% by weight of aluminum trihydrate, about 2% by weight of a benzoyl peroxide (BPO) catalyst, and chemical additives such as de-aerating agents and coupling agents. The resin mix 111 flows into the resin channels 110 from the resin reservoir 114 via the resin inlet 105 and completely fills the deposited cast material 108. The nichrome based metal heating elements 113 within the air bag 103 are switched on and the resin mix 111 and deposited cast material 108 are heated to a temperature of about 85 degree Celsius until the resin 111 gels and cures. The nichrome based metal heating elements 113 may also be switched on prior to introduction of the resin 111. The air bag 103 is then deflated using the vacuum pump 107 connected to the air bag 103 and the resulting composite on the bottom release layer 102 is removed after the air bag 103 recedes.

Optionally, in another embodiment, the volumetrically restraining body structure 101 which was originally in the horizontal position, is made to incline at an angle of about 30 degrees as exemplarily illustrated in FIG. 5. The vacuum outlet 109 is at a greater height than the resin inlet 105. The resin reservoir 114 is gradually moved up vertically, and the resin 111 is injected into the deposited cast material 108.

The foregoing examples have been provided merely for the purpose of explanation and are in no way to be construed as limiting of the invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. An apparatus for manufacturing a composite, comprising:
    a volumetrically restraining body structure that defines a cavity;
    a bottom release layer disposed within said cavity of said volumetrically restraining body structure, wherein said bottom release layer supports a cast material deposited on said bottom release layer;
    an air bag disposed between said bottom release layer and one or more surfaces of said volumetrically restraining body structure within said cavity, wherein one or more surfaces of said air bag are composed of a flexible metal sheet surfaced with a silicone coating;
    an air compressor connected to said air bag for pressurizing said air bag, wherein said pressurized air bag compresses said deposited cast material against said bottom release layer;
    one or more resin inlets disposed on said deposited cast material for infusing resin into said deposited cast material; and
    a vacuum outlet insertably connected in said cavity of said volumetrically restraining body structure, in communication with said deposited cast material, for drawing a vacuum through said deposited cast material and for drawing said resin from said one or more resin inlets into said deposited cast material;
    whereby said compression of said deposited cast material by said pressurized air bag reduces excessive resin rich areas in said composite created from said deposited cast material infused with said resin.

2. The apparatus of claim 1, wherein one of said one or more surfaces of said air bag proximal to said bottom release layer serves as a top release layer.

3. The apparatus of claim 1, further comprising a vacuum pump connected to said air bag for deflating said air bag and enabling easy retrieval of said deposited cast material infused with said resin.

4. The apparatus of claim 1, further comprising a vacuum sealing strip integrated into said one or more surfaces of said air bag that are proximal to said deposited cast material for establishing a vacuum seal between said one or more surfaces of said air bag and said bottom release layer.

5. The apparatus of claim 1, further comprising a vacuum sealing strip integrated into one or more surfaces of said bottom release layer for establishing a vacuum seal between said one or more surfaces of said air bag and said bottom release layer.

6. The apparatus of claim 1, further comprising one or more resin channels integrated into said one or more surfaces of said air bag that are proximal to said deposited cast material for infusing said resin into said deposited cast material.

7. The apparatus of claim 1, further comprising a heating means positioned within said air bag for heating said deposited cast material infused with said resin to one of a partial cure and a full cure.

8. The apparatus of claim 7, wherein said heating means comprises resistive elements.

9. The apparatus of claim 7, wherein said heating means comprises infrared heating elements.

10. The apparatus of claim 7, further comprising a thermal insulation applied to a top surface of said air bag for avoiding heat loss through a top surface of said air bag.

11. An apparatus for manufacturing a composite, comprising:
    a volumetrically restraining body structure that defines a cavity;
    a bottom release layer disposed within said cavity of said volumetrically restraining body structure, wherein said bottom release layer supports a cast material deposited on said bottom release layer;
    an air bag disposed between said bottom release layer and one or more surfaces of said volumetrically restraining body structure within said cavity;

an air compressor connected to said air bag for pressurizing said air bag, wherein said pressurized air bag compresses said deposited cast material against said bottom release layer;

one or more resin inlets disposed on said deposited cast material for infusing resin into said deposited cast material; and a vacuum outlet insertably connected in said cavity of said volumetrically restraining body structure, in communication with said deposited cast material, for drawing a vacuum through said deposited cast material and for drawing said resin from said one or more resin inlets into said deposited cast material, wherein said volumetrically restraining body structure is inclinable at varying angles for flattening a shape of the front of said resin flowing in said deposited cast material;

whereby said compression of said deposited cast material by said pressurized air bag reduces excessive resin rich areas in said composite created from said deposited cast material infused with said resin.

12. An apparatus for manufacturing a composite, comprising:

a volumetrically restraining body structure that defines a cavity;

a bottom release layer disposed within said cavity of said volumetrically restraining body structure, wherein said bottom release layer supports a cast material deposited on said bottom release layer;

an air bag disposed between said bottom release layer and one or more surfaces of said volumetrically restraining body structure within said cavity;

an air compressor connected to said air bag for pressurizing said air bag, wherein said pressurized air bag compresses said deposited cast material against said bottom release layer;

one or more resin inlets disposed on said deposited cast material for infusing resin into said deposited cast material;

a vacuum outlet insertably connected in said cavity of said volumetrically restraining body structure, in communication with said deposited cast material, for drawing a vacuum through said deposited cast material and for drawing said resin from said one or more resin inlets into said deposited cast material;

a heating means positioned within said air bag for heating said deposited cast material infused with said resin to one of a partial cure and a full cure; and a heat reflective coating applied to an inner top surface of said air bag for avoiding heat loss and for focusing heat onto said deposited cast material.

* * * * *